(12) United States Patent
Reddy

(10) Patent No.: US 9,222,446 B2
(45) Date of Patent: Dec. 29, 2015

(54) FUEL STORAGE SYSTEM FOR A VEHICLE

(75) Inventor: Sam R. Reddy, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1161 days.

(21) Appl. No.: 13/207,492

(22) Filed: Aug. 11, 2011

(65) Prior Publication Data

US 2013/0037007 A1 Feb. 14, 2013

(51) Int. Cl.
*F02M 33/02* (2006.01)
*F02M 25/08* (2006.01)
*B60K 15/035* (2006.01)

(52) U.S. Cl.
CPC ........ *F02M 25/089* (2013.01); *B60K 15/03504* (2013.01); *B60K 2015/03514* (2013.01); *B60Y 2200/92* (2013.01)

(58) Field of Classification Search
CPC ........... B60K 15/035; B60K 15/03504; B60K 15/03519; B60K 2015/03514; F02M 25/08; F02M 25/0809; F02M 25/0818; F02M 33/02; F02M 33/04; F02M 25/0854; F02M 25/089; F02M 25/0836
USPC .................................. 123/518, 519, 520, 521
See application file for complete search history.

(56) References Cited

U.S. PATENT DOCUMENTS

| | | | |
|---|---|---|---|
| 4,203,401 A * | 5/1980 | Kingsley et al. | 123/520 |
| 4,280,466 A * | 7/1981 | Walters | 123/520 |
| 5,056,494 A | 10/1991 | Kayanuma | |
| 5,280,775 A * | 1/1994 | Tanamura et al. | 123/518 |
| 5,359,978 A * | 11/1994 | Kidokoro et al. | 123/520 |
| 5,456,236 A * | 10/1995 | Wakashiro et al. | 123/519 |
| 5,456,238 A | 10/1995 | Horiuchi et al. | |
| 5,477,836 A | 12/1995 | Hyodo et al. | |
| 5,477,842 A * | 12/1995 | Maruyama et al. | 123/690 |
| 5,605,177 A * | 2/1997 | Ohashi et al. | 137/587 |
| 5,634,450 A | 6/1997 | Hara et al. | |
| 5,845,625 A * | 12/1998 | Kidokoro et al. | 123/520 |
| 5,957,113 A * | 9/1999 | Masaki et al. | 123/518 |
| 6,038,912 A * | 3/2000 | Isobe et al. | 73/1.59 |
| 6,089,080 A | 7/2000 | Takaku et al. | |

(Continued)

FOREIGN PATENT DOCUMENTS

| | | |
|---|---|---|
| DE | 102008045010 A1 | 3/2010 |
| DE | 102010013959 A1 | 6/2010 |

(Continued)

OTHER PUBLICATIONS

Schematic drawing of a fuel vapor vent system for a 2010 Toyota Prius and attached photo of the Canister Filter shown therein.

*Primary Examiner* — Hai Huynh
*Assistant Examiner* — Raza Najmuddin
(74) *Attorney, Agent, or Firm* — Quinn Law Group, PLLC

(57) ABSTRACT

An evaporative emission control system for a fuel tank of a vehicle includes a diurnal control module coupled to a vapor exhaust line running between the fuel tank and an activated carbon canister. A purge line is coupled to the canister and is open to atmospheric pressure. The purge line includes a breathing loss accumulator that collects fuel vapors expelled from the canister during diurnal thermal expansion. The diurnal control module closes fluid communication between the fuel tank and the canister when the fuel tank is not being refueled to maintain the fuel tank in a pressurized condition and the canister in a non-pressurized condition.

12 Claims, 1 Drawing Sheet

(56) References Cited

U.S. PATENT DOCUMENTS

| | | | |
|---|---|---|---|
| 6,279,548 B1* | 8/2001 | Reddy | 123/520 |
| 6,321,727 B1* | 11/2001 | Reddy et al. | 123/520 |
| 6,330,879 B1* | 12/2001 | Kitamura et al. | 123/520 |
| 6,463,889 B2* | 10/2002 | Reddy | 123/3 |
| 6,470,862 B2* | 10/2002 | Isobe et al. | 123/520 |
| 6,540,815 B1 | 4/2003 | Hiltzik et al. | |
| 6,736,116 B2* | 5/2004 | Kawano | 123/520 |
| 6,796,295 B2* | 9/2004 | Kidokoro et al. | 123/520 |
| 6,988,396 B2 | 1/2006 | Matsubara et al. | |
| 7,047,952 B1* | 5/2006 | Yamauchi et al. | 123/519 |
| 7,114,492 B2* | 10/2006 | Reddy | 123/518 |
| 7,159,580 B2* | 1/2007 | Shikama et al. | 123/520 |
| 7,311,089 B2* | 12/2007 | Balsdon | 123/520 |
| 7,341,048 B2* | 3/2008 | Koyama et al. | 123/518 |
| 7,389,769 B2* | 6/2008 | Amano et al. | 123/520 |
| 7,467,620 B1* | 12/2008 | Reddy | 123/520 |
| 7,481,101 B2 | 1/2009 | Matsubara et al. | |
| 7,614,387 B2 | 11/2009 | Wang et al. | |
| 7,665,447 B2* | 2/2010 | Shinagawa et al. | 123/516 |
| 7,845,337 B2* | 12/2010 | Song | 123/520 |
| 8,245,699 B2* | 8/2012 | Peters et al. | 123/518 |
| 8,434,461 B2* | 5/2013 | Kerns et al. | 123/521 |
| 8,459,240 B2* | 6/2013 | Lee et al. | 123/519 |
| 8,739,767 B2* | 6/2014 | Horiba et al. | 123/520 |
| 2001/0049958 A1* | 12/2001 | Yamaguchi et al. | 73/40.5 R |
| 2001/0054415 A1* | 12/2001 | Hanai et al. | 123/520 |
| 2002/0078931 A1* | 6/2002 | Makino et al. | 123/519 |
| 2002/0124836 A1* | 9/2002 | Reddy | 123/518 |
| 2002/0153374 A1 | 10/2002 | Isobe | |
| 2002/0184938 A1* | 12/2002 | Isobe et al. | 73/1.71 |
| 2002/0184942 A1* | 12/2002 | Isobe et al. | 73/118.1 |
| 2003/0010095 A1* | 1/2003 | Hirano et al. | 73/49.7 |
| 2003/0061871 A1* | 4/2003 | Oki et al. | 73/118.1 |
| 2003/0226549 A1* | 12/2003 | Takagi et al. | 123/520 |
| 2004/0089062 A1* | 5/2004 | Matsubara et al. | 73/118.1 |
| 2004/0089063 A1* | 5/2004 | Matsubara et al. | 73/118.1 |
| 2006/0065253 A1* | 3/2006 | Reddy | 123/520 |
| 2007/0113831 A1* | 5/2007 | Hoke et al. | 123/519 |
| 2007/0266997 A1* | 11/2007 | Clontz et al. | 123/519 |
| 2008/0302341 A1* | 12/2008 | Reddy | 123/520 |
| 2009/0025694 A1 | 1/2009 | Shinagawa et al. | |
| 2009/0216426 A1 | 8/2009 | Wang et al. | |
| 2009/0288645 A1* | 11/2009 | Childress et al. | 123/520 |
| 2010/0252006 A1 | 10/2010 | Reddy | |
| 2011/0011472 A1 | 1/2011 | McLain et al. | |
| 2011/0265768 A1* | 11/2011 | Kerns et al. | 123/521 |
| 2011/0301823 A1* | 12/2011 | Ashford et al. | 701/102 |
| 2012/0073549 A1* | 3/2012 | Lee et al. | 123/520 |
| 2012/0118273 A1* | 5/2012 | Kim et al. | 123/520 |
| 2013/0037007 A1* | 2/2013 | Reddy | 123/521 |

FOREIGN PATENT DOCUMENTS

| | | |
|---|---|---|
| EP | 2063098 A1 | 11/2006 |
| WO | 2009061533 A1 | 5/2009 |

* cited by examiner

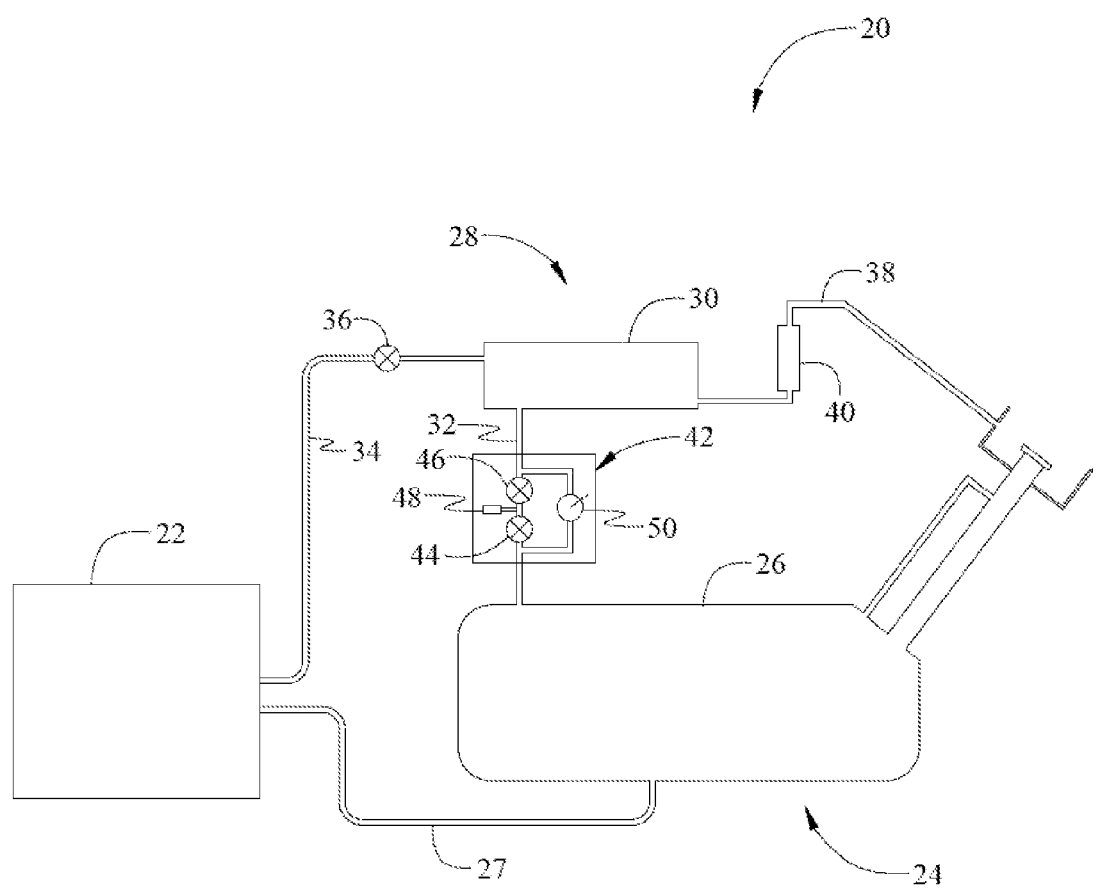

FUEL STORAGE SYSTEM FOR A VEHICLE

TECHNICAL FIELD

The invention generally relates to a fuel storage system for a vehicle, and more specifically to an evaporative emission control system.

BACKGROUND

Vehicles include a fuel storage system for storing fuel, such as but not limited to gasoline, for an internal combustion engine. The fuel storage system includes a fuel tank for storing the fuel therein. Fuel tank headspace is occupied by fuel vapors, which are a mixture of air and hydrocarbons. As the tank is filled, the fuel vapors are forced out of the tank. In order to capture the expelled fuel vapors during fueling, the fuel tank is coupled to and in fluid communication with a canister. The fuel vapors expelled from the fuel tank during refueling operations flow into the canister. The canister includes a tightly packed bed of activated carbon particles that capture the fuel vapors, and prevents the fuel vapors from escaping into the atmosphere. The canister is coupled to the engine to supply the fuel vapors to the engine during operation. As such, when the engine is running, the engine draws the fuel vapors from the canister, and uses the fuel vapors for combustion.

The fuel vapors trapped within the fuel tank and the canister are subjected to diurnal, i.e., daily, expansion and contraction cycles caused by the daily increase and decrease in temperature. As the temperature rises, the pressure within the fuel tank and the canister increases. As the temperature cools, the pressure within the fuel tank and the canister decreases. Unless prevented, this diurnal expansion and contraction cycle may force the fuel vapors trapped within the canister into the atmosphere. This is particularly important for Extended Range Electric Vehicles and other hybrid vehicles that operate primarily on battery power, and may use an internal combustion engine only sparingly to charge the batteries or otherwise power the vehicle. In many circumstances, these hybrid vehicles may not operate, i.e., run, their internal combustion engine on a regular basis. As such, when the internal combustion engine of a hybrid vehicle is not operated over an extended period of time, the fuel vapors remain trapped within the canister. Continued exposure to additional fuel vapors from the fuel tank may cause the canister to become fully saturated. Accordingly, the fuel storage system must include an evaporate emission control system that minimizes and/or prevents the loss of fuel vapors.

SUMMARY

A fuel storage system for a vehicle is provided. The fuel storage system includes a fuel tank. A vapor exhaust line is coupled to and in fluid communication with the fuel tank. A canister is coupled to and in fluid communication with the vapor exhaust line. The canister is configured for receiving fuel vapor through the vapor exhaust line from the fuel tank. A diurnal control module is coupled to the vapor exhaust line, and is configured for controlling fluid flow through the vapor exhaust line between the fuel tank and the canister. An engine supply line is coupled to and in fluid communication with the canister. The engine supply line is configured for directing fuel vapors from the canister to an engine. A purge line is also coupled to and in fluid communication with the canister. The purge line is open to the atmosphere, and is configured for allowing purge air into the canister. A breathing loss accumulator is coupled to and in fluid communication with the purge line. The breathing loss accumulator is configured for accumulating fuel vapor expelled from the canister during thermal expansion of the fuel vapor within the canister, and is also configured for allowing fuel vapor accumulated within the breathing loss accumulator to flow back into the canister during thermal contraction of the fuel vapor within the canister.

A vehicle is also provided. The vehicle includes an internal combustion engine, and a fuel storage system that is configured for storing fuel and supplying fuel to the internal combustion engine. The fuel storage system includes a fuel tank. A canister is coupled to and in fluid communication with the fuel tank. The canister is configured for receiving fuel vapor from the fuel tank during refueling of the fuel tank. A diurnal control module interconnects the fuel tank and the canister. The diurnal control module is configured for controlling fluid flow between the fuel tank and the canister. A breathing loss accumulator is coupled to and in fluid communication with the canister. The breathing loss accumulator is configured for accumulating fuel vapor expelled from the canister during thermal expansion of the fuel vapor within the canister, and is also configured for allowing fuel vapor accumulated within the breathing loss accumulator to flow back into the canister during thermal contraction of the fuel vapor within the canister.

An evaporative emission control system for a fuel tank of a vehicle is also provided. The evaporative emission control system includes a canister. A vapor exhaust line is coupled to and in fluid communication with the canister. The vapor exhaust line is configured for directing fuel vapor from the fuel tank to the canister during refueling of the fuel tank. A diurnal control module is coupled to the vapor exhaust line, and is configured for controlling fluid flow through the vapor exhaust line. When the fuel tank is not being refueled, the diurnal control module is configured to block fluid communication between the fuel tank and the canister to maintain the fuel tank in a pressurized condition and to maintain the canister in a non-pressurized condition. When the fuel tank is being refueled, the diurnal control module is configured to open fluid communication between the fuel tank and the canister so that fuel vapors expelled from the fuel tank may collect in the canister. A purge line is coupled to and in fluid communication with the canister. The purge line is open to the atmosphere, and is configured for allowing purge air into the canister. A breathing loss accumulator is coupled to and in fluid communication with the purge line. The breathing loss accumulator is configured for accumulating fuel vapor expelled from the canister during thermal expansion of the fuel vapor within the canister, and is also configured for allowing fuel vapor accumulated within the breathing loss accumulator to flow back into the canister during thermal contraction of the fuel vapor within the canister.

Accordingly, the configuration of the evaporative emission control system, and particularly the positioning of the diurnal control module along the vapor exhaust line between the fuel tank and the canister, allows for the fuel tank to be pressurized to seal the fuel tank and prevent expulsion of fuel vapors from the fuel tank during diurnal thermal expansion and contraction cycles, while allowing the canister to remain at atmospheric pressure. This system requires fewer pressurized components, reducing the risk of leaks to the atmosphere. The breathing loss accumulator collects the fuel vapors expelled from the canister during thermal expansion, and allows the collected fuel vapors to flow back into the canister during thermal contraction, thereby reducing and/or eliminating expulsion of fuel vapors to the atmosphere caused by the diurnal expansion and contraction cycle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic diagram of a vehicle showing an internal combustion engine and a fuel storage system therefore.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to FIG. 1, wherein like numerals indicate like parts throughout the several views, a vehicle is generally shown at 20. The vehicle 20 includes an internal combustion engine 22, such as but not limited to a gasoline engine 22 or a diesel engine 22. The vehicle 20 further includes a fuel storage system 24. The fuel storage system 24 includes a fuel tank 26. The fuel tank 26 stores fuel for the internal combustion engine 22, and supplies the fuel to the internal combustion engine 22 through a primary fuel line 27.

The fuel storage system 24 includes an evaporative emission control system 28 for the fuel tank 26. The evaporative emission control system 28 collects fuel vapor that is displaced from the fuel tank 26 during refueling of the fuel tank 26 to prevent the fuel vapor from escaping the fuel storage system 24. The evaporative emission control system 28 includes an activated carbon canister 30 which absorbs the fuel vapor displaced from the fuel tank 26. A vapor exhaust line 32 is coupled to and in fluid communication with the fuel tank 26 and the canister 30. The vapor exhaust line 32 directs the fuel vapor displaced from the fuel tank 26 to the canister 30.

An purge line 34 is coupled to and in fluid communication with the canister 30 and the internal combustion engine 22. The purge line 34 directs fuel vapors from the canister 30 to the engine 22. The purge line 34 may include a purge valve 36 disposed therein. The purge valve 36 is moveable between an open position allowing fluid flow between the canister 30 and the internal combustion engine 22, and a closed position that blocks fluid flow between the canister 30 and the internal combustion engine 22. When the internal combustion engine 22 is running, the purge valve 36 may be opened to allow the fuel vapors collected within the canister 30 to flow to the internal combustion engine 22 for combustion therein. When the internal combustion engine 22 is not running, the purge valve 36 is closed.

A vent line 38 is coupled to and in fluid communication with the canister 30. The vent line 38 is open to the atmosphere, and is therefore subject to atmospheric pressure. The vent line 38 allows a flow of purge air into the canister 30 as the fuel vapors are being drawn from the canister 30 into the engine 22 to purge the air within the canister 30 and prevent a vacuum from forming within the canister 30.

A breathing loss accumulator 40 is coupled to and in fluid communication with the vent line 38. The breathing loss accumulator 40 accumulates any fuel vapor expelled from the canister 30 during thermal expansion of the fuel vapor within the canister 30. Upon the thermal contraction of the air within the canister 30, the breathing loss accumulator 40 allows any fuel vapor accumulated within the breathing loss accumulator 40 to flow back into the canister 30. Accordingly, as the ambient temperature rises, the volume of the fuel vapors within the canister 30 increases. Because the canister 30 is exposed to the atmospheric pressure through the vent line 38, and is not pressurized to contain the volume of the fuel vapors, the fuel vapors may be expelled or displaced from the canister 30 through the vent line 38. The breathing loss accumulator 40 collects the fuel vapors before the fuel vapors are vented outside of the evaporative emission control system 28. As the ambient temperature cools, the volume of the fuel vapors within the canister 30 decreases, thereby drawing the fuel vapors from the breathing loss accumulator 40 back into the canister 30. The breathing loss accumulator 40 therefore prevents the escape of fuel vapors from the activated carbon canister 30 that may otherwise occur from the diurnal expansion and contraction of the fuel vapors within the non-pressurized activated carbon canister 30.

The breathing loss accumulator 40 may include any size suitable for the size of the canister 30. For example, a one liter canister 30 may expel nearly two hundred cubic centimeters (200 cc) of gaseous mixture containing more than twenty percent (20%) hydrocarbons in air during a diurnal expansion cycle. Accordingly, a suitable size for the breathing loss accumulator 40 for a one liter activated carbon canister 30 may include an accumulating volume equal to or greater than two hundred cubic centimeters (200 cc). However, it should be appreciated that the accumulating volume of the breathing loss accumulator 40 may differ from that example above. The breathing loss accumulator 40 operates on the principle that the expelled gaseous mixture from the canister 30 is heavier than air. Accordingly, the breathing loss accumulator 40 is configured and positioned such that the heavier gaseous mixture settles in the breathing loss accumulator 40, and is not allowed to pass therethrough.

The evaporative emission control system 28 further includes a diurnal control module 42. The diurnal control module 42 is coupled to the vapor exhaust line 32 that extends between the fuel tank 26 and the canister 30. The diurnal control module 42 controls fluid flow through the vapor exhaust line 32 between the fuel tank 26 and the canister 30. When the fuel storage tank is not being refueled, the diurnal control module 42 operates to maintain the fuel tank 26 in a pressurized condition, while maintaining the canister 30 in a non-pressurized condition. When the fuel tank 26 is being refueled, the diurnal control module 42 operates to open fluid communication between the fuel tank 26 and the canister 30 to allow the fuel vapors displaced by the liquid fuel to flow into the canister 30.

The diurnal control module 42 includes a first valve 44 and a second valve 46. The second valve 46 is disposed in-line with the first valve 44. Both the first valve 44 and the second valve 46 may include any suitable type and/or style of an on/off valve. When the fuel tank 26 is not being refueled, at least one of the first valve 44 and the second valve 46 is closed to block fluid communication between the fuel tank 26 and the canister 30. Preferably, the first valve 44 is normally disposed in the closed position to block fluid communication through the vapor exhaust line 32. When the fuel tank 26 is being refueled, both the first valve 44 and the second valve 46 are disposed in an open position to allow fuel vapor to flow into and collect in the canister 30.

Preferably, the diurnal control module 42 is configured for pressure testing the fuel storage system 24 for leaks in both the pressurized fuel tank 26 and the non-pressurized canister 30. As such, the diurnal control module 42 may include a pressure sensor 48 disposed within the vapor exhaust line 32 between the first valve 44 and the second valve 46. When the first valve 44 is open and the second valve 46 is closed, the pressure sensor 48 is exposed to the pressure within the fuel tank 26. Since the fuel tank 26 is sealed, the pressure should remain constant. When the first valve 44 is closed and the second valve 46 is open, the pressure sensor 48 is exposed to the pressure within the canister 30, which should be the same as atmospheric pressure. Accordingly, the diurnal control module 42 may pressure test both the canister 30 and the fuel tank 26, while maintaining the fuel tank 26 in a sealed and pressurized condition, and maintaining the canister 30 in the non-pressurized condition.

The diurnal control module 42 may further include a pressure/vacuum relief valve 50. The pressure/vacuum relief valve 50 bypasses the first valve 44 and the second valve 46, and opens fluid communication between the fuel tank 26 and the canister 30 when the pressure within the fuel tank 26 rises above a pre-determined pressure limit or falls below a pre-determined vacuum limit. Accordingly, if there is a severe pressure or vacuum increase within the fuel tank 26, the pressure/vacuum relief valve 50 operates to relieve the severe pressure or vacuum increase to prevent any damage to the fuel storage system 24. The pressure/vacuum relief valve 50 may include any suitable type of valve that is capable of opening in response to a sensed pressure above the pre-determined pressure limit, or a vacuum below a pre-determined vacuum limit.

While the best modes for carrying out the invention have been described in detail, those familiar with the art to which this invention relates will recognize various alternative designs and embodiments for practicing the invention within the scope of the appended claims.

The invention claimed is:

1. A fuel storage system for a vehicle, the fuel storage system comprising:
    a fuel tank;
    a vapor exhaust line coupled to and in fluid communication with the fuel tank;
    a canister coupled to and in fluid communication with the vapor exhaust line, and configured for receiving fuel vapor through the vapor exhaust line from the fuel tank;
    a diurnal control module coupled to the vapor exhaust line and configured for controlling fluid flow through the vapor exhaust line between the fuel tank and the canister;
    wherein the diurnal control module is configured for maintaining the fuel tank in a pressurized condition while maintaining the canister in a non-pressurized condition when the fuel storage tank is not being refueled;
    a purge line coupled to and in fluid communication with the canister and configured for directing fuel vapors from the canister to an engine;
    a vent line coupled to and in fluid communication with the canister and open to the atmosphere, wherein the vent line is configured for allowing purge air into the canister; and
    a breathing loss accumulator coupled to and in fluid communication with the vent line and configured for accumulating fuel vapor expelled from the canister during thermal expansion of the fuel vapor within the canister, and configured for allowing fuel vapor accumulated within the breathing loss accumulator to flow back into the canister during thermal contraction of the fuel vapor within the canister;
    wherein the diurnal control module includes a first valve, a second valve, and a pressure sensor, with the second valve disposed in-line with the first valve, and with the pressure sensor disposed between the first valve and the second valve;
    wherein the diurnal control module is configured for pressure testing for leaks in both the pressurized fuel tank and the non-pressurized canister; and
    wherein the first valve is closed and the second valve is open to enable the pressure sensor to sense a pressure at the canister.

2. A fuel storage system as set forth in claim 1 wherein the breathing loss accumulator includes an accumulating volume equal to or greater than two hundred cubic centimeters (200 cc).

3. A fuel storage system as set forth in claim 1 wherein the first valve includes an on/off valve.

4. A fuel storage system as set forth in claim 1 wherein the second valve includes an on/off valve.

5. A fuel storage system as set forth in claim 1 wherein at least one of the first valve and the second valve is closed when the fuel tank is not being refueled to block fluid communication between the fuel tank and the canister, and wherein both the first valve and the second valve are open while the fuel tank is being refueled to allow fuel vapor to collect in the canister.

6. A fuel storage system as set forth in claim 1 wherein the first valve is open and the second valve is closed to enable the pressure sensor to sense a pressure at the fuel tank.

7. A fuel storage system as set forth in claim 1 wherein the diurnal control module includes a pressure/vacuum relief valve bypassing the first valve and the second valve and configured for opening fluid communication between the fuel tank and the canister when the pressure within the fuel tank rises above a pre-determined pressure limit or falls below a pre-determined vacuum limit.

8. A vehicle comprising:
    an internal combustion engine; and
    a fuel storage system configured for storing and supplying fuel to the internal combustion engine, the fuel storage system including:
        a fuel tank;
        a canister coupled to and in fluid communication with the fuel tank and configured for receiving fuel vapor from the fuel tank during refueling of the fuel tank;
        a diurnal control module interconnecting the fuel tank and the canister and configured for controlling fluid flow between the fuel tank and the canister;
        a breathing loss accumulator coupled to and in fluid communication with the canister and configured for accumulating fuel vapor expelled from the canister during thermal expansion of the fuel vapor within the canister, and configured for allowing fuel vapor accumulated within the breathing loss accumulator to flow back into the canister during thermal contraction of the fuel vapor within the canister;
        wherein the diurnal control module includes a first valve, a second valve, and a pressure sensor, with the second valve disposed in-line with the first valve, and with the pressure sensor disposed between the first valve and the second valve; and
        wherein the first valve is closed and the second valve is open to enable the pressure sensor to sense a pressure at the canister.

9. A vehicle as set forth in claim 8 wherein the diurnal control module is configured for maintaining the fuel tank in a pressurized condition while maintaining the canister in a non-pressurized condition when the fuel storage tank is not being refueled.

10. A vehicle as set forth in claim 9 wherein the breathing loss accumulator includes an accumulating volume equal to or greater than two hundred cubic centimeters (200 cc).

11. A vehicle as set forth in claim 8 wherein the diurnal control module includes a pressure/vacuum relief valve bypassing the first valve and the second valve and configured for opening fluid communication between the fuel tank and the canister when the pressure within the fuel tank rises above a pre-determined pressure limit or falls below a pre-determined vacuum limit.

12. An evaporative emission control system for a fuel tank of a vehicle, the evaporative emission control system comprising:
   a canister;
   a vapor exhaust line coupled to and in fluid communication with the canister and configured for directing fuel vapor from the fuel tank to the canister during refueling of the fuel tank;
   a diurnal control module coupled to the vapor exhaust line and configured for controlling fluid flow through the vapor exhaust line;
   wherein the diurnal control module is configured to block fluid communication between the fuel tank and the canister to maintain the fuel tank in a pressurized condition and to maintain the canister in a non-pressurized condition when the fuel tank is not being refueled, and is configured to open fluid communication between the fuel tank and the canister during refueling so that fuel vapors expelled from the fuel tank may collect in the canister;
   a vent line coupled to and in fluid communication with the canister and open to the atmosphere, wherein the vent line is configured for allowing purge air into the canister;
   a breathing loss accumulator coupled to and in fluid communication with the vent line and configured for accumulating fuel vapor expelled from the canister during thermal expansion of the fuel vapor within the canister, and configured for allowing fuel vapor accumulated within the breathing loss accumulator to flow back into the canister during thermal contraction of the fuel vapor within the canister;
   wherein the diurnal control module includes a first valve, a second valve, and a pressure sensor, with the second valve disposed in-line with the first valve, and with the pressure sensor disposed between the first valve and the second valve; and
   wherein the first valve is closed and the second valve is open to enable the pressure sensor to sense a pressure at the canister.

* * * * *